US008874968B1

(12) United States Patent
Nilsson et al.

(10) Patent No.: US 8,874,968 B1
(45) Date of Patent: Oct. 28, 2014

(54) METHOD AND SYSTEM FOR TESTING A PROCESSOR DESIGNED BY A CONFIGURATOR

(75) Inventors: Anders Nilsson, Linköping (SE); Eric Tell, Linköping (SE); Olof Kraigher, Linköping (SE)

(73) Assignee: Coresonic AB, Linkoping (SE)

( * ) Notice: Subject to any disclaimer, the term of this patent is extended or adjusted under 35 U.S.C. 154(b) by 280 days.

(21) Appl. No.: 13/458,918

(22) Filed: Apr. 27, 2012

(51) Int. Cl.
*G06F 11/00* (2006.01)

(52) U.S. Cl.
USPC .......................................... 714/38.1

(58) Field of Classification Search
CPC ................. G06F 11/10; H04L 43/50
See application file for complete search history.

(56) References Cited

U.S. PATENT DOCUMENTS

| 7,353,131 B2 * | 4/2008 | Devins et al. ................. 702/118 |
| 7,353,431 B2 * | 4/2008 | Lopez et al. ................. 714/47.2 |
| 7,698,661 B2 * | 4/2010 | Ohara ........................... 716/104 |
| 2008/0256135 A1 * | 10/2008 | Nelson et al. .............. 707/104.1 |

* cited by examiner

*Primary Examiner* — Christopher McCarthy
(74) *Attorney, Agent, or Firm* — Carr & Ferrell LLP

(57) ABSTRACT

The present invention provides a system and method that includes a library module including a plurality of programmable components and at least one corresponding test case for each programmable component. The system also includes the configurator module coupled to the library module and accessing at least one of the plurality of programmable components and the at least one corresponding test case. The configurator module further outputs a code describing a processor for running a software-defined digital signal processor and includes the accessed programmable component and a plurality of interconnections linking the accessed programmable component. The system further includes a test case generator coupled to the configurator to output a test suite including the at least one corresponding test case for each accessed programmable component and a plurality of interconnect tests to test the plurality of interconnections linking the accessed programmable component.

23 Claims, 8 Drawing Sheets

METHOD AND SYSTEM FOR TESTING A PROCESSOR DESIGNED BY A CONFIGURATOR

FIELD OF THE INVENTION

The present invention relates generally to digital signal processors, and more specifically, to a method and system for debugging and testing a multi-core digital signal processor designed using a configurator.

BACKGROUND

Processors have progressively decreased in size and increased in processing power for many years. Multi-core processors allow one chip to have multiple processors operating in parallel to increase power and speed.

Tablet computers and mobile phones, particularly smartphones, are growing in popularity. Mobile phones, and possibly tablet computers, include antennas to connect to a wireless network, also referred to as a cell network. Multiple standards exist for voice communication over mobile phones, including CDMA, GSM, and UMTS. Additional and overlapping multiple standards exist for wireless connections to the internet, including 3GPP, LTE, Edge, and UMTS.

A mobile phone may be hard-wired to be used with a particular communication protocol. Alternatively, a mobile phone may utilize a software-defined radio that may be programmed during the manufacturing process, and which may be subsequently re-programmed by a user. Software-defined radio advantageously allows a single device to be used with multiple standards, which allows manufacturers to market the same product to markets serviced by different standards. Software-defined radio also provides a significant benefit to the consumer by allowing the consumer to have the flexibility to use a mobile phone that is initially programmed for a first standard in a first service area, in a second service area serviced by a second standard, simply by re-programming the phone.

Programming a software-defined radio requires programming a processor, for instance a multi-core processor, to operate as a digital signal processor. Different mobile telephony and/or data standards require different software programs, and different processor configurations also require different software programs. Testing a multi-core processor may require hand writing many tests, and may therefore be time consuming, laborious, and subject to error.

SUMMARY OF THE INVENTION

According to exemplary embodiments, the present invention provides a system that includes a library module including a plurality of programmable components and at least one corresponding test case for each programmable component. The system also includes the configurator module coupled to the library module and accessing at least one of the plurality of programmable components and the at least one corresponding test case. The configurator module further outputs a code describing a processor for running a software-defined digital signal processor and includes the accessed programmable component and a plurality of interconnections linking the accessed programmable component. The system further includes a test case generator coupled to the configurator to output a test suite including the at least one corresponding test case for each accessed programmable component and a plurality of interconnect tests to test the plurality of interconnections linking the accessed programmable component.

A non-transitory computer readable medium having recorded thereon a program is provided. The program when executed causes a computer to perform a method. The method generates test cases for a processor designed by a configurator module. The method includes accessing a library module including a plurality of programmable components and a corresponding set of test cases for each programmable component, and outputting, using a configurator module coupled to the library module, a code describing the processor including at least one accessed programmable component and a plurality of interconnections linking the accessed programmable component. The processor runs a software-defined digital signal processor. The method also includes generating a test suite including the corresponding set of test cases for each accessed programmable component and a plurality of interconnect tests to test the plurality of interconnections linking the accessed programmable component.

A multi-core processor for processing digital signals tested by a method is provided. The method includes accessing a library module including a plurality of programmable components and a corresponding set of test cases for each programmable component, and outputting, using a configurator module coupled to the library module, a code describing the processor including at least one accessed programmable component and a plurality of interconnections linking the accessed programmable component. The multi-core processor runs a software-defined digital signal processor. The method further includes generating a test suite including the corresponding set of test cases for each accessed programmable component and a plurality of interconnect tests to test the plurality of interconnections linking the accessed programmable component.

These and other advantages of the present invention will be apparent when reference is made to the accompanying drawings and the following description.

DETAILED DESCRIPTION OF EXEMPLARY EMBODIMENTS

Figure 1:
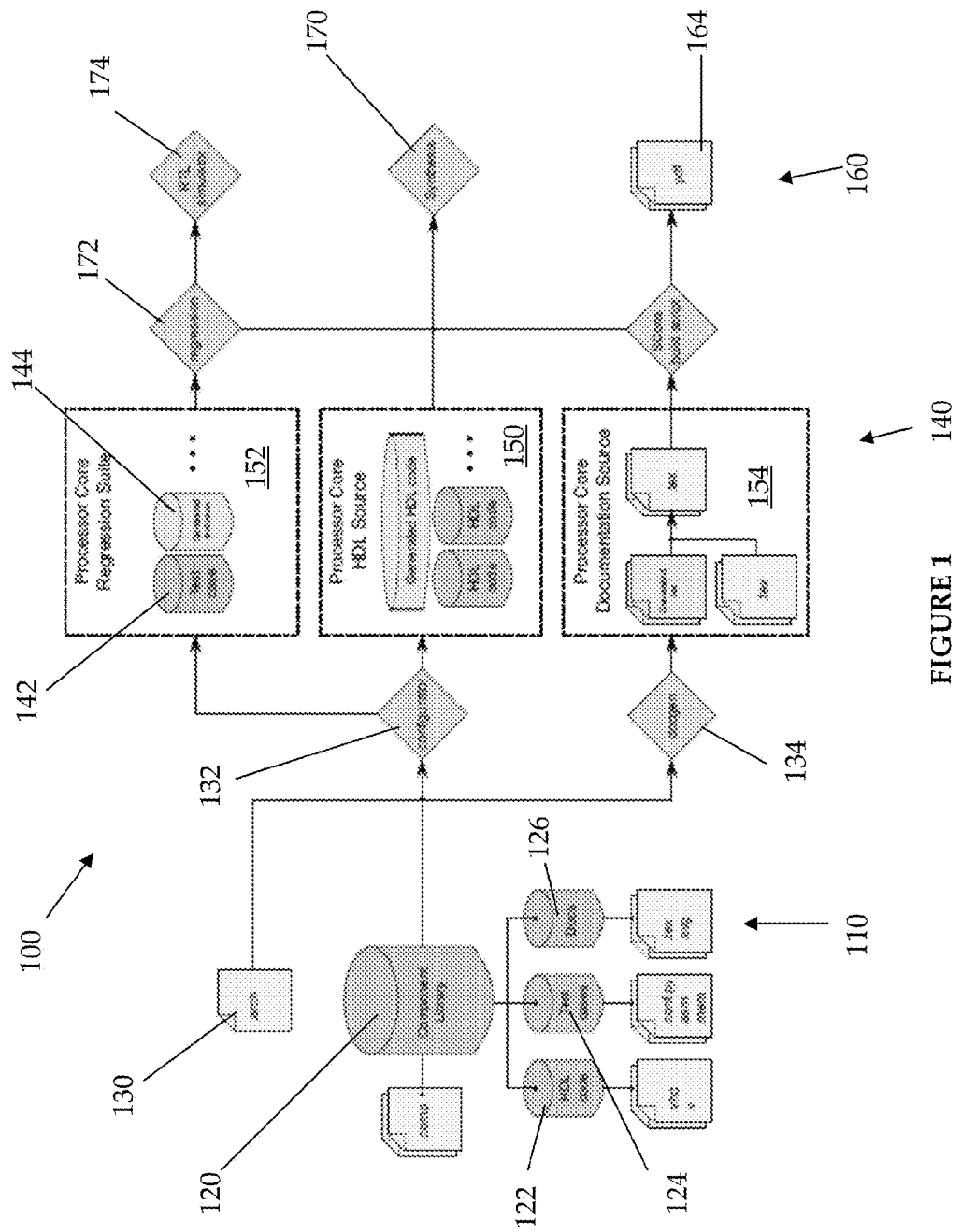
FIG. 1 is a schematic diagram illustrating an exemplary process.

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated. According to exemplary embodiments, the present technology relates generally to multi-core processors. More specifically, the present invention provides a system and method for testing multi-core processors designed to operate as digital signal processors.

A configurator for generating the design of a processor for running a digital signal processor is provided that also generates a testing suite (also referred to as a set of test cases or a debug logic). Since the configurator generates the interconnects as well as selecting the programmable components for use in the processor, the configurator also is able to produce a testing regime for testing the interconnects and the programmable components.

The test system provided herein verifies that the digital signal processor is configured correctly. In particular, the testing system verifies a set of inputs for external interfaces such as a digital front end, a CMAC interface, and memories, and also verifies a software-defined digital signal processor by checking the outputs, including both external interface and memories, and comparing the outputs with external reference data (also referred to as golden reference data).

Conventionally, when HDL code for a processor or multi-processor system is delivered to a customer, a test suite that, when run on the processor gives a certain test coverage (for example every line of HDL code should be exercised, all signals should be toggled etc.), may also be delivered.

Each unique processor/system needs a unique test suite adapted for the specific configuration in order to reach the required test coverage. In a highly scalable architecture having many parameters for each component, there may be many different possible systems. It would be very time consuming to manually adapt the test suite for each system generated, and therefore the present technology automatically generates a test suite for any configuration.

Based on the same component and architecture files used by the configurator, a test suite is generated with two kinds of tests: 1) tests for interconnects, and 2) tests for specific component types. Tests for interconnects between components can be generated by a configurator during or after a configuration for a processor is created. Tests for each component in a library may be written to reach full test coverage for that component type. In principle each test consists of: 1) a program that should be run on the processor, 2) stimuli (also referred to as input data, a stimuli file, or sample data) to the program, and 3) gold data (also referred to as reference data) that can be matched to the output of the program to verify the test. A test suite may be optimized by eliminating duplicate tests.

Since components may have different parameters and the parameter settings may have an impact on the output of the program, different gold data is needed for each parameter set. The present technology provides a model that generates the gold data, optionally at the time the test is run, based on the component parameters. In a similar manner, it is also possible to generate different stimuli and programs for different configurations.

Additionally, many components cannot be tested in isolation. To verify the behavior of a component, in most cases it must interact with other components in the system. Since every component in an architecture is configurable, the other components available in a system are unknown prior to configuring. For example, to verify an execution unit component, the execution unit typically connects to one or more memory components. A testcase for the execution unit must be able to adapt to situations in which different numbers of memory components are available in the system, and also adapt to different names for the memory components. Each component instance is given a name in an architecture file, and this name may be used to refer to the component in a program or programs.

Each test case therefore specifies: 1) the type of component the test is testing, 2) what other components are needed in the system to run the test, and 3) what properties the components must have. Properties may be, for example, specific parameter settings or network connectivity. The properties may be relative to other allocated components. For example, component A may be specified as able to read data from component B. Alternatively, two components may be required to have the same value on some common parameter (i.e., any value may be acceptable, as long as it is the same for both components). One instance of the test is then generated for each instance of the component type that should be tested.

In the test specification each allocated component has an alias that refers to the component instance in the test program. The test generator automatically generates a mapping from the aliases in the test program to the instance names used in the actual architecture. In the test program, aliases are used to refer to the components, but for each generated test, the names are translated into the real names for that particular test instance.

During test suite generation, the tool goes through all tests for each component type included in the system, checks which tests can be allocated (i.e. checks if there are any combination of components in the system which fulfills all requirements specified in the test case) on this particular system, and adds them to the test suite.

One goal of a test suite is to verify the digital signal processor, which is achieved by writing tests in a reusable way, and enable customers or users of a configurator to write their own tests targeting a programmable component designed by the customer or user.

For example, a processor with any number of programmable components may be instantiated by a configurator in code for manufacturing a processor. Each of the programmable components may require testing, and in particular, the precision of a CMAC in a software-defined processor may be tested.

Test sets may be provided for each class of programmable component, and sub-sets of tests may be provided when a programmable component has a variable dimension. To ensure the validity of the test class, all of the constraints for the variables of the programmable component should be designated.

The number and types of memories and CMACs and the interconnects comes from the system files in the library module. All legal combinations that require testing can be specified in a file associated with the programmable component and stored in the library module. In this manner, a test class for all of the variations of a CMAC may be extrapolated from a single test by the configurator, and substantial efficiency is achieved. Symbolic names for each of the memories, CMACs and other programmable components are used in the configurator to allow for each of the memories and CMACs to be tested.

The test generation includes generating a driver that another program can use for test, thereby solving an allocation problem and assuring that all permutations are covered and tested. A static input and output case may be assigned, but this fails to account for the numerous variable parameters in the programmable component and the associated programmable components. The configurator and/or test generator assigns a suitable test file (also referred to as a sample data) and a gold file (also referred to as reference data), in view of the selectable parameters of the components.

The present system and method provides a processor configuration framework. Conventionally, a supplier of processors delivers processors and test cases. In an exemplary embodiment of the present invention, users of a configurator according to the present invention need not disclose the architecture of the processor outside their organization.

A system for programming a highly configurable DSP in a multi-core processor having different core sizes and configurations, is provided. The DSP may include execution units, cross bar switches, and memory units, all also referred to as programmable components. A library of components is provided, which may include components programmed by a user or customer. The system may incorporate in a DSP any number of programmable hardware components. A central software element of the system is a configurator that uses a programming toolkit to create the HDL code (Hardware Description Language, also referred to as RTL (Register Transfer Level) code) for the DSP, a simulator, the documentation, and test cases for the particular DSP.

The programmable components of a DSP may include: complex multiply-accumulate units (CMACs) of different sizes, complex multipliers, vector registered files, different types and sizes of co-processors, different types and sizes of memories, different complex data members, different accelerators, and different interface components.

A system file may point to a processor file, or a number of processors, which in turn may point to a library component. The library component may include a description of a desired programmable component, as well as the data and/or specifications associated with the programmable component that may be fed into a configurator. The configurator generates an HDL description that can be used for synthesis. Using the provided system, a customer having a particular input indicating the amount of resources required for a software-defined DSP may create an architecture file describing the required resources, may then receive a customized HDL code, a customized simulator, generated test vectors, and generated documentation.

In this manner, a new programmable component may be added to the library module of a system by a customer using the system to design a processor. The customer may add the new component after the system has been deployed to the customer. This enables customers to deploy the new component, without requiring rewrites in the HDL code, manual allocations in a test case, or rewrites of the documentation, which instead may be automatically implemented. An XML file describing the component is provided to the customer, which may include one or more of a number of predefined interface types between components in the system. Alternatively, the customer can produce the XML file.

The configurator receives an input of the components to be used in the DSP and determines how each component should be connected to all the other components and to the other parts of the system. The HDL code for the component (the hardware description of the component) may be provided in an initial library module, or may be added to the library module by a customer creating a customized programmable component.

In the DSP, the components may be hand written, while all of the interconnects and the crossbar switch may be generated by the configurator. For example, the configurator may generate an interconnect (also referred to as a wire) between two components, and the interconnect may be specified in an HDL file, and then generated based on the HDL file. Every logic in a crossbar and every interconnect may have corresponding HDL code, which may also be utilized in a simulation model.

The configurator provided generates a design or plan for one or more DSP processors. The system generates an HDL code from a set of programmable components, generates a crossbar, and connects all of these components. The configurator accesses the library of programmable components, which includes different types of interfaces, and information on how each component should be connected to other components. Templates in the configurator include a crossbar and/or the connections necessary, useful and/or possible for the crossbar.

The configurator generates the HDL code, which may include a network crossbar. Creating the HDL code is one task performed by the configurator provided herein. A crossbar includes a connection matrix, and the configurator additionally performs optimization by evaluating all of the possible connections and the port widths, and the incoming ports that can be used in those connections. The configurator then generates an optimized hardware structure, including the connection matrix, which is embodied in the HDL code. The minimal hardware required to fulfill the specified connectivity in the system file. The system file includes the connectivity requirements.

Each CMAC and its associated memory or memories requires connections to each other and to the network. Each connection, also referred to herein as an interface, must be instantiated by the HDL code. The configurator transfers the connectivity requirements that the user specifies in the original DSP design and/or the specifications in the library associated with a programmable component, into an optimized HDL code that fulfills the connectivity requirements, with the minimal hardware structure.

Each component in the component library may be described by a file, which may be an XML file, and the processor may be described by another file, which may be an XML file. The architecture file may enable a user to integrate specialized, custom programmable components into the library of the system, which may in turn be accessed by the configurator. The components in the library may define the necessary or optional interfaces, master ports, control registers, and memories. From this library, the configurator generates the HDL code FIG. 1 is a schematic diagram illustrating process 100 for designing a multi-core processor to operate as a digital signal processor according to the present technology. Process 100 utilizes libraries 110 and configurator module 140, and generates output set 160. Libraries 110 include architecture file 130 and component library 120. Component library 120 accesses sub-libraries including HDL code sub-library 122, test cases sub-library 124, and docs sub-library 126. Component library 120, and/or its sub-libraries, may include descriptions, coding, documentation, and testing for programmable components, which may be pre-populated or augmented by a user. Configurator 132 accesses component library 120, as well as architecture file 130, to generate a design for a processor core with processor core source code 150, and additionally or alternatively, to create regression suite 152 including test cases for the processor core. The test cases of regression suite 152 include accessed test case 142 corresponding to an accessed programmable component, and generated test case 144. Processor core source code 150 includes both HDL code generated by configurator 132 and HDL code accessed from HDL code sub-library 122 and/or component library 120. As discussed previously, the HDL code referred to herein may be HDL code. Elements 150, 152, and 154 represent programming code and/or files. Docgen 134 generates documentation by accessing component library 120, docs sub-library 126, and/or architecture file 130, and producing documentation source 154, which includes documentation files. Final documentation 164 is output from documentation source 154, and may be a .pdf file. Processor core source code 150 is the input to synthesis 170, which may be a software or firmware program for generating a multi-core processor. Regression suite 152 outputs regression 172, which outputs to RTL simulator 174.

Figure 2:
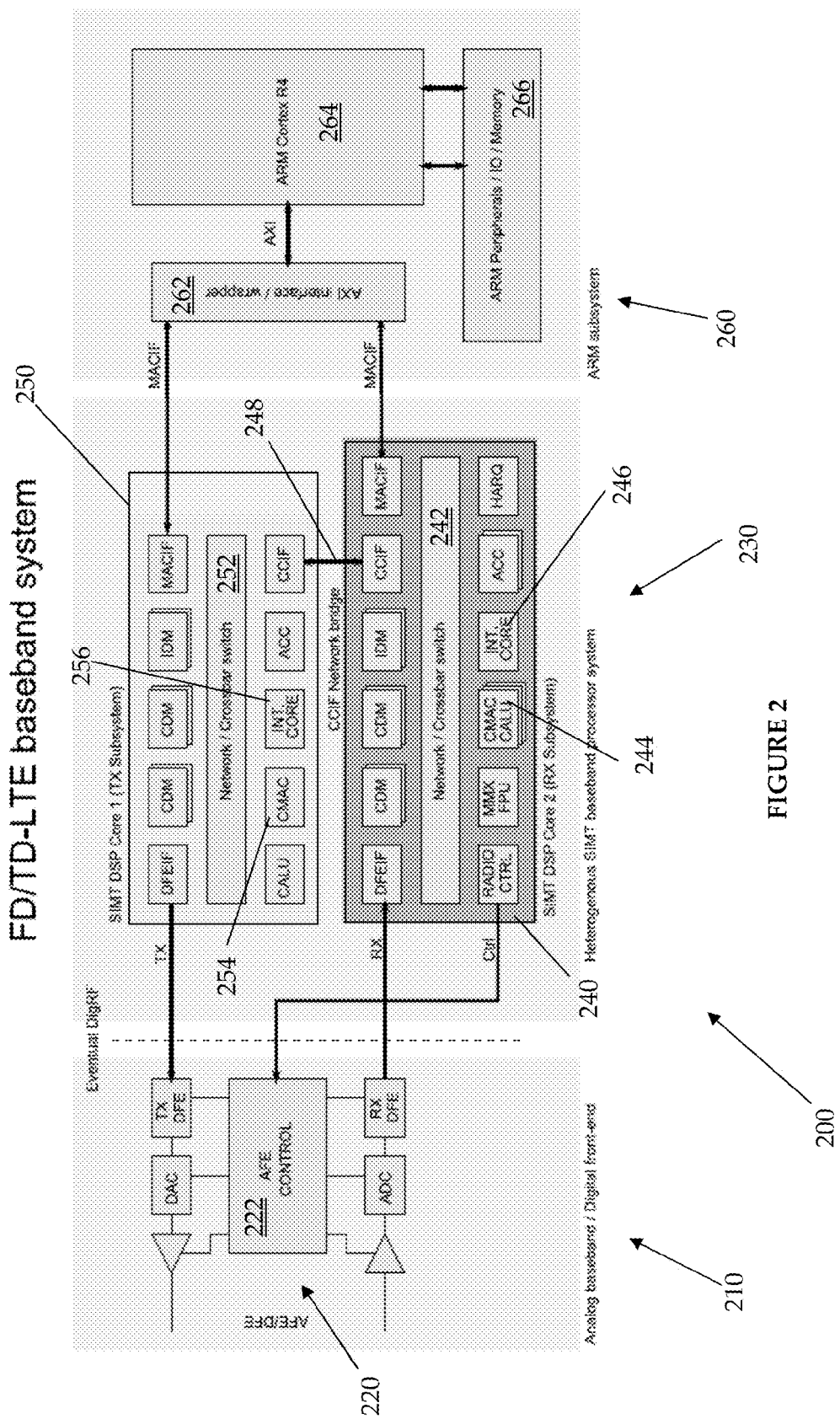
FIG. 2 is a schematic diagram illustrating an exemplary baseband system.

FIG. 2 is a schematic diagram illustrating baseband system 200 for processing digital signals. Baseband system 200 includes analog baseband/digital front end 210, heterogeneous SIMT (Single Instruction Multiple Thread) baseband processor system 230, and ARM subsystem 260. Analog baseband/digital front end 210 includes analog/digital converter (also referred to as an A/D converter) 220, which in turn includes AFE control 222, which controls the AFE (Analog Front End).

Heterogeneous SIMT baseband processor system 230 includes SIMT DSP core 240, which is a processor that is part of a receiver subsystem, and also includes SIMT DSP core 250, which is a processor that is part of a transmission subsystem. Additional processors are also possible, and alternative functional divisions between processors are also possible. SIMT DSP core 240 includes network/crossbar switch 242 that connects submodules of the receiving subsystem, including CMAC 244 and core 246. Core 246 is an integer core, which is the integer and control part of the SIMT DSP core 240. SIMT DSP core 250 includes network/crossbar switch 252 that connects submodules of the transmitting subsystem, including CMAC 254 and core 256. Core 256 is an integer core, which is the integer and control part of the SIMT DSP core 250. SIMT DSP core 240 and SIMT DSP core 250 are connected by CCIF (Core to Core InterFace) network bridge 248 that provides communication between the processors of heterogeneous SIMT baseband processor system 230. CCIF network bridge 248 passes control messages between SIMT DSP core 240 and SIMT DSP core 250 and/or between any particular programmable elements in SIMT DSP core 240 and SIMT DSP core 250. Additionally, CCIF network bridge 248 may be multiple bridges.

ARM subsystem 260 includes AXI interface/wrapper 262, ARM cortex R4 264, and ARM peripherals/TO/memory 266. AXI interface/wrapper 262, communicates with a MACIF (Media Access Control Interface) of each of SIMT DSP core 240 and SIMT DSP core 250, and is coupled to ARM cortex R4 264. ARM cortex R4 264 communicates with ARM peripherals/TO/memory 266.

This system shown in FIG. 2 is exemplary, and host processors other than ARM cortex R4 264 may be used, and alternatively any host processor may be used in the same manner. Additionally, an interface bus other than AXI interface/wrapper 262 may be used, and alternatively any interface bus may be used in the same manner.

Figure 3:
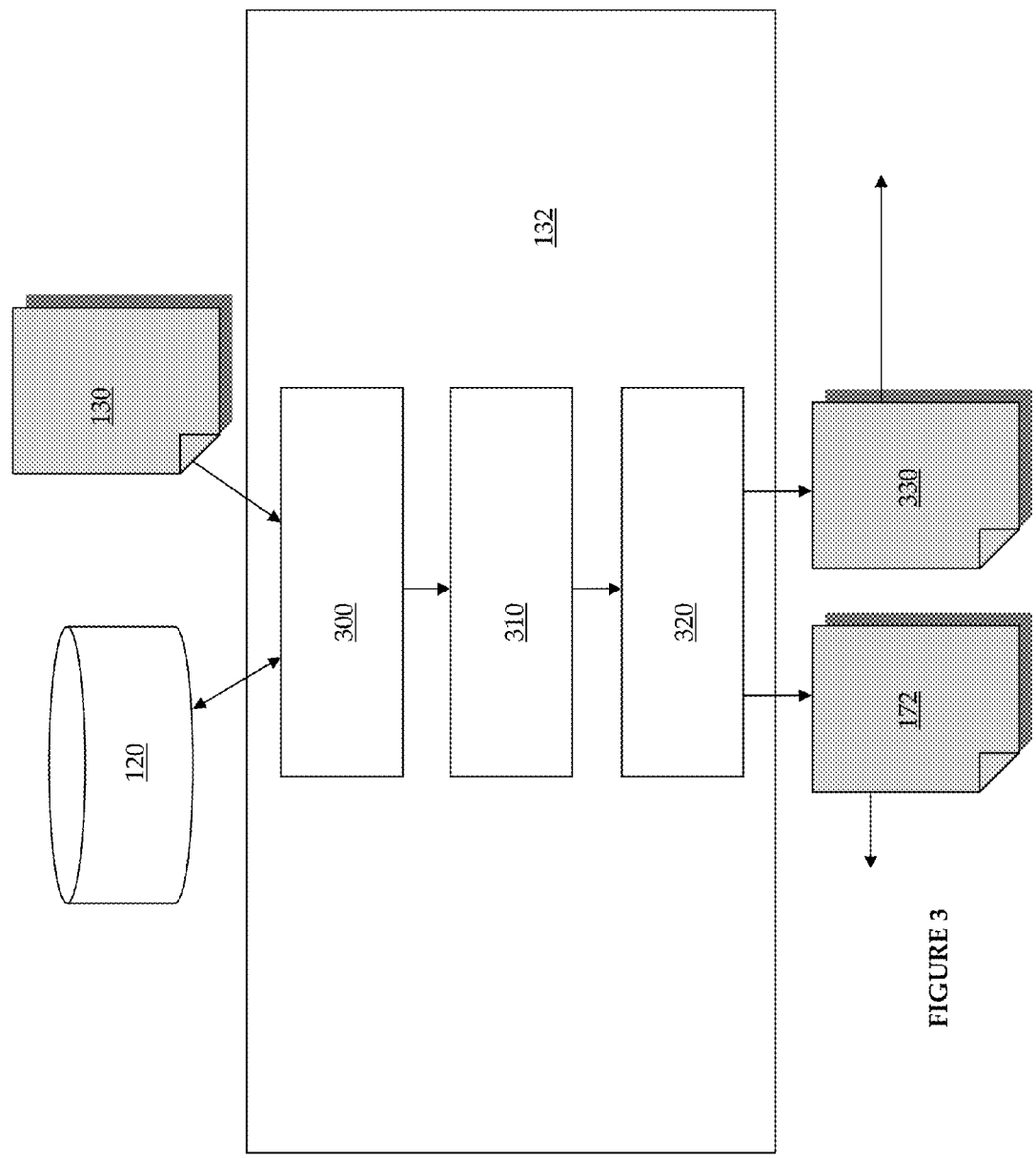
FIG. 3 is a schematic diagram illustrating a multi-core processor of the baseband system of FIG. 2.

FIG. 3 is a schematic diagram illustrating an exemplary configurator for use in a system for designing a digital signal processor. In FIG. 3, architecture file 130 is input into elaboration module 300 of configurator 132. Architecture file 130 may describe a DSP system and may describe processors, define inter-processor interfaces, for instance in a control and/or data plane, and may define resource sharing capabilities. Elaboration module 300 may parse architecture file 130 and retrieve component specifications from component library 120, and/or its sub-libraries. These specifications may include descriptions, coding, documentation, and testing for programmable components, which may be pre-populated or augmented by a user. Specifically, the components may include reusable sub-blocks such as accelerators, vector units, memories and co-processors. Elaboration module 300 may output to allocation module 310 of configurator 132. Allocation module 310 may assign port indices and optimize control register space, and may output to emit system file module 320 of configurator 132, which may output system file 330 and regression 172.

System file 330 may be an intermediate file that contains information about various aspects of the DSP system, and which may be a source of knowledge about the DSP system for one or more sub-processes. For instance, system file 330 may be used to generate user documentation. User documentation may include table and graphs of system properties such as network connectivity, network port indices, control register addresses, memory sizes, instruction issue group layout. User documentation may also include hand written documentation for each component from component library 120. System file 330 may also be used to generate firmware development headers, which may present system dependent information in assembly and C header files.

System file 330 may be used to generate and package HDL code, which may include component specific and common HDL files fetched from component library 120 and instantiated on a processor top level with system dependent parameters. Inter-processor busses/interfaces may be generated from system specification, for instance complex network bridge, core-to-core interface, and resource sharing interfaces, etc. Intra processor busses/interfaces may be generated from system specification, for instance a control register bus, complex network, integer network, and issue logic etc. Memory models for simulation or synthesis purposes, and memory wrappers for on-chip debug operations, may also be generated. System and processor level test benches, which may interact with regression testing tool may be generated.

Regression 172 may further be used in regression suite selection operations that may involve searching a test library for testcases that map to a configured system and instantiating them with system specific parameters. A regression suite selection may also generate new testcases for known structures, for example networks, busses, issue logic, and debug logic etc.

Figure 4:
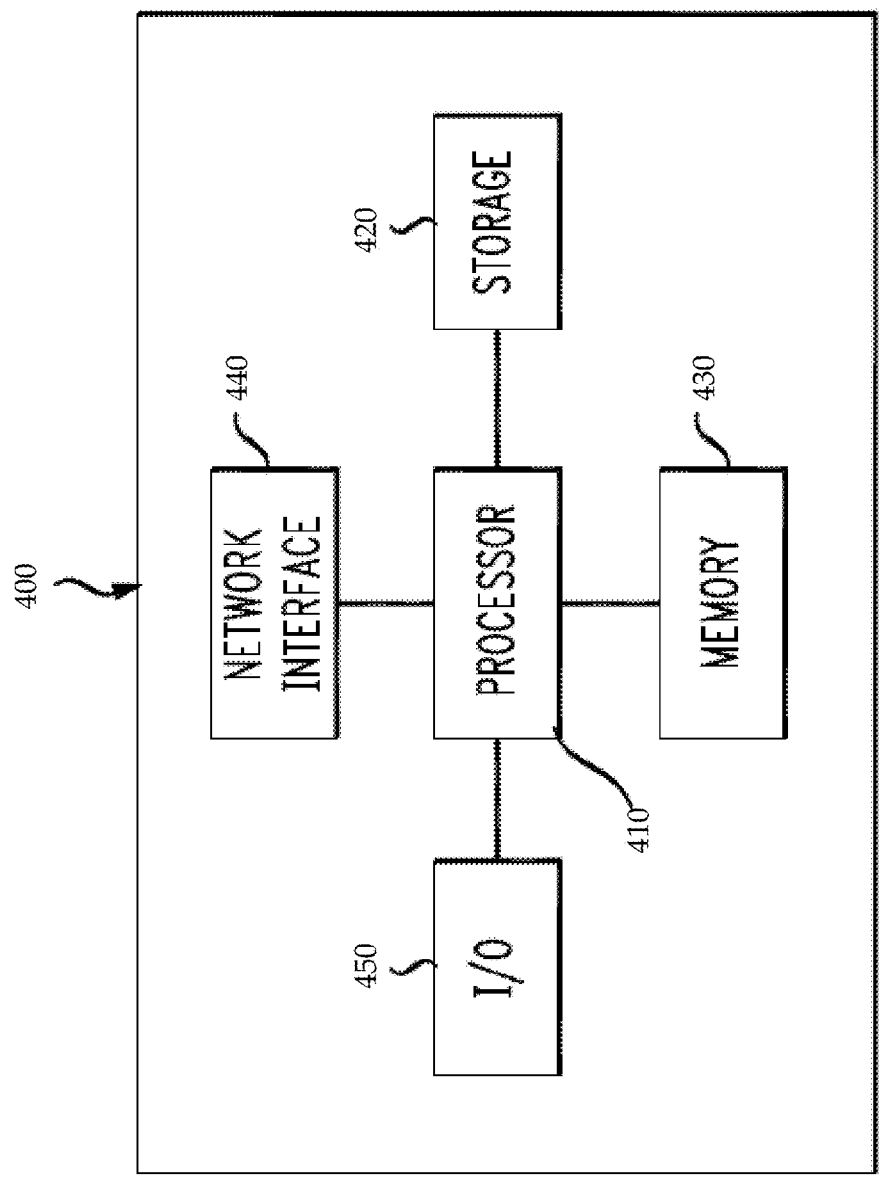
FIG. 4 illustrates a computer system according to an exemplary embodiment.

FIG. 4 illustrates a computer system according to an exemplary embodiment. Computer 400 may, for example, control process 100, operate libraries 110, and/or run configurator 132 or configurator module 140 in FIG. 1. Additionally, computer 400 can perform the steps described herein (e.g., with respect to FIG. 6). Computer 400 contains processor 410 which controls the operation of computer 400 by executing computer program instructions which define such operation, and which may be stored on a computer-readable recording medium. The computer program instructions may be stored in storage 420 (e.g., a magnetic disk, a database) and loaded into memory 430 when execution of the computer program instructions is desired. Thus, the computer operation will be defined by computer program instructions stored in memory 430 and/or storage 420 and computer 400 will be controlled by processor 410 executing the computer program instructions. Computer 400 also includes one or more network interfaces 440 for communicating with other devices, for example other computers, servers, or websites. Network interface 440 may, for example, be a local network, a wireless network, an intranet, or the Internet. Computer 400 also includes input/output 450, which represents devices which allow for user interaction with the computer 400 (e.g., display, keyboard, mouse, speakers, buttons, webcams, etc.). One skilled in the art will recognize that an implementation of an actual computer will contain other components as well, and that FIG. 4 is a high level representation of some of the components of such a computer for illustrative purposes.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the invention.

It is noteworthy that any hardware platform suitable for performing the processing described herein is suitable for use with the invention. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that include one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Figure 5:
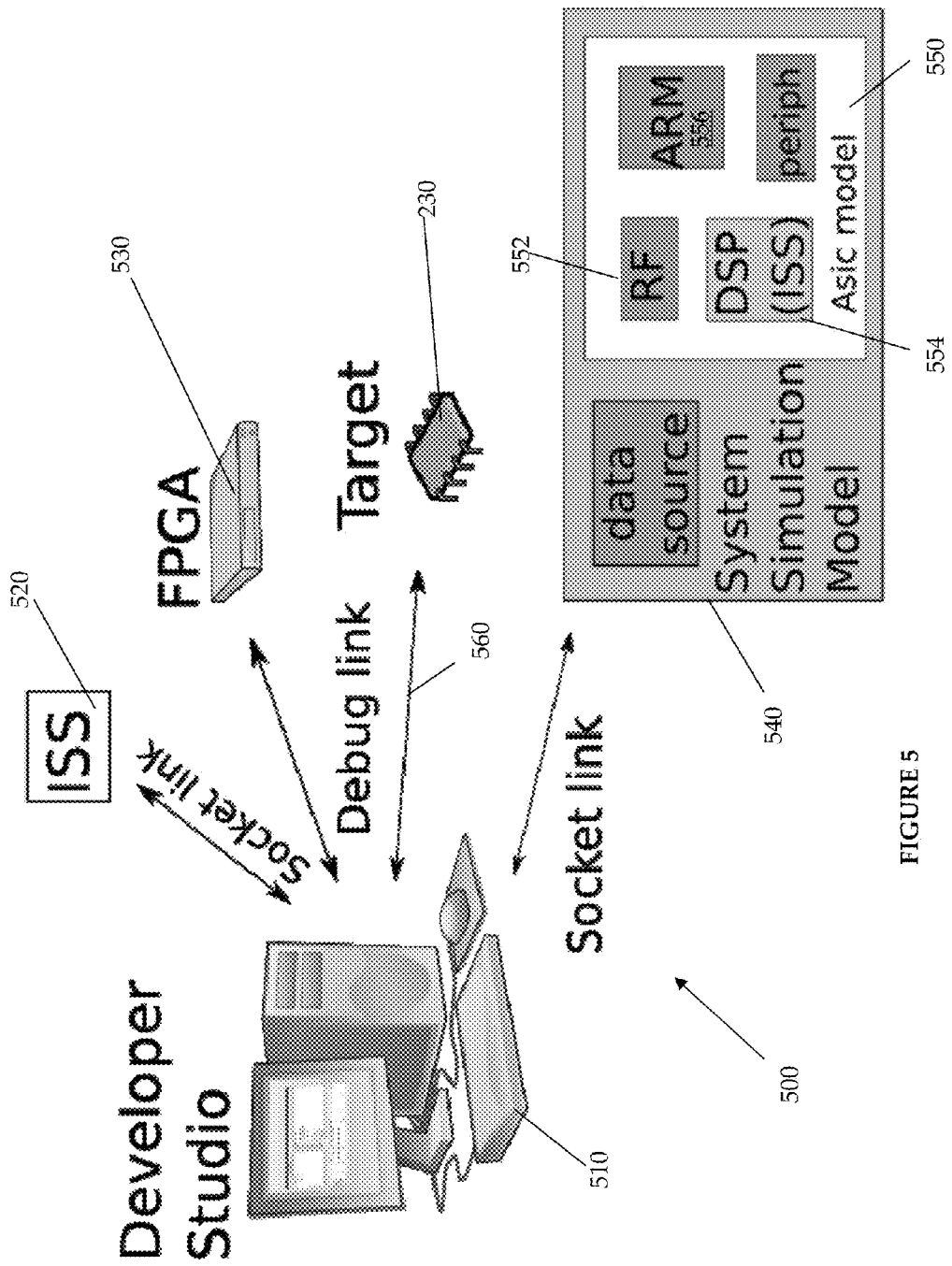
FIG. 5 is a schematic diagram illustrating a developer system for programming a multi-core processor.

FIG. 5 is a schematic diagram illustrating developer system 500 for programming multi-core processor, which may be heterogeneous SIMT baseband processor system 230, according to the present technology. Developer system 500 includes developer studio 510, which may include a computer having a display, memory, user input devices, and a coupling to an intranet and/or internet. Developer system 500 may include a socket link to ISS 520 and a debug link to FPGA 530. ISS 520 is an instruction set simulator that may be the main simulator for the DSP. FPGA 530 stands for Field Programmable Gate Array, and is a device that normally is used for prototyping the heterogeneous SIMT baseband processor system 230. Developer system 500 may also include a socket link to system simulation model 540 and debug link 560 to heterogeneous SIMT baseband processor system 230. System simulation model 540 may include several submodules, including Asic model 550 that in turn includes RF 552, DSP (ISS) 554, ARM 556, and peripherals.

Figure 6:
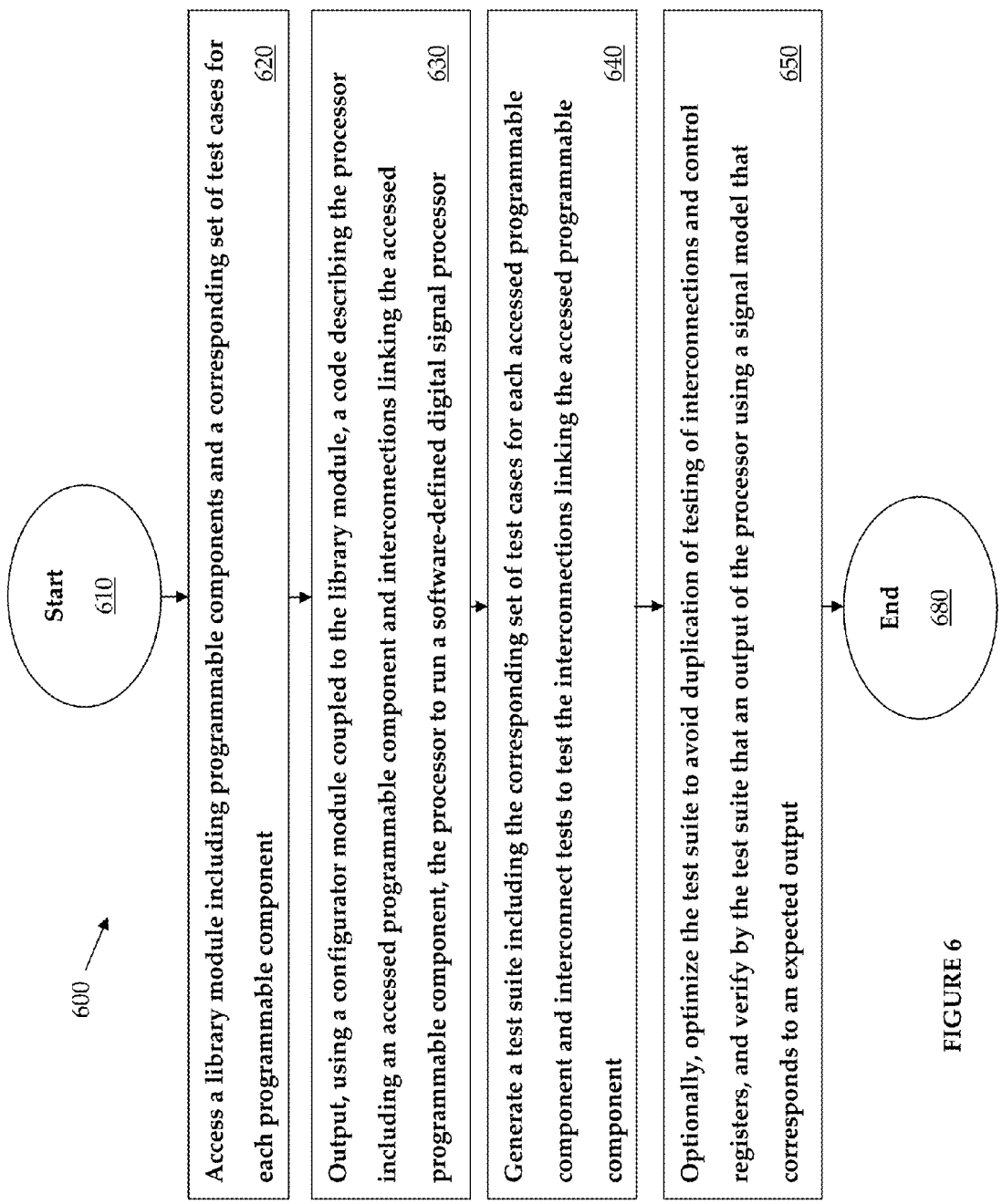
FIG. 6 is a flow chart illustrating an exemplary method.

FIG. 6 illustrates method 600 for testing a digital signal processor. Method 600 starts at start oval 610 and proceeds to operation 620, which indicates to access a library module including programmable components and a corresponding set of test cases for each programmable component. From operation 620, the flow proceeds to operation 630, which indicates to output, using a configurator module coupled to the library module, a code describing the processor including an accessed programmable component and interconnections linking the accessed programmable component. The processor runs a software-defined digital signal processor. From operation 630, the flow proceeds to operation 640, which indicates to generate a test suite including the corresponding set of test cases for each accessed programmable component and interconnect tests to test the interconnections linking the accessed programmable component. From operation 640, the flow proceeds to operation 650, which indicates to, optionally, optimize the test suite to avoid duplication of testing of interconnections and control registers, and verify by the test suite that an output of the processor using a signal model that corresponds to an expected output. From operation 650, the flow proceeds to end oval 680.

Figure 7:
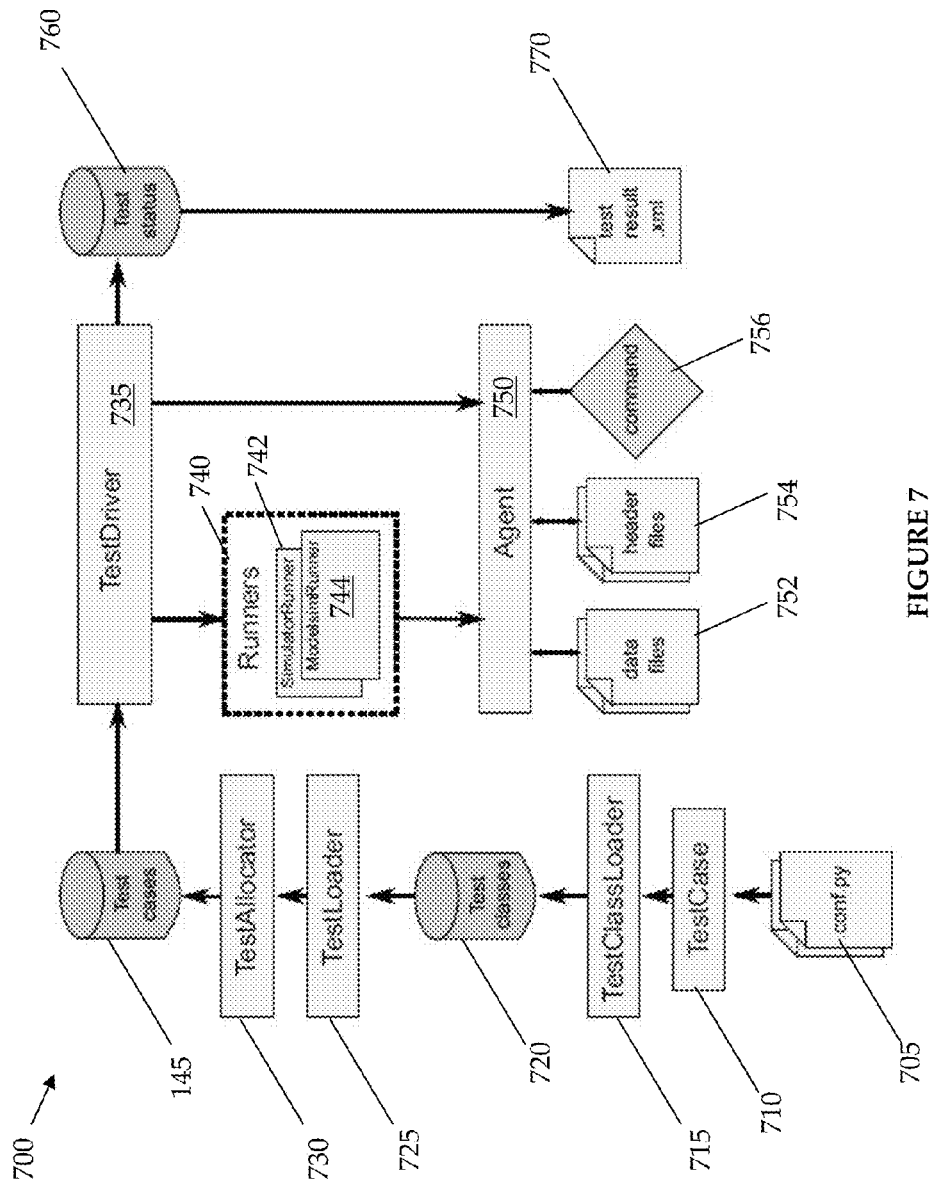
FIG. 7 is a schematic diagram illustrating an exemplary testing system.

FIG. 7 is a schematic diagram illustrating exemplary testing system 700. Regression is built around high level test driver 735, which runs the regression suite using one or several platform specific runners 740. An exemplary system includes two platform-specific runners, one for the instruction set simulator, Simulator Runner 742, and one for ModelSim, ModelSim Runner 744. The test runners provide a method to run the test on the respective platform and another method to hand over the resulting output data to test driver 735. Test driver 735 can then check the resulting output data against the golden reference data or against the results of other test runners. Test driver 735 produces TestStatus objects 760 for each test case which is used to write a JUnit compatible XML-file 770. Test driver 735 also outputs to agent 750, which bilaterally communicates with data files 752, header files 754, and command 756.

All test cases 710 must be subclasses of the TestCase class. TestClassLoader 715 may load all test classes 720 from .conf.py file 705 and TestLoader 725 will allocate via TestAllocator 730 and instantiate test cases 145 for a specific architecture.

A TestCase class may have a setup method. The setup is called by the test driver through agent 750 before the test runners are asked to execute the test case. The setup method is the place to configure the golden reference and stimuli data. When an instance of the TestCase class is created by the test loader it will receive several member variables of the TestInstance class. The TestInstance class is a placeholder for anything which can have golden reference data or stimuli data, such as complex data memories, integer data memories, the Core data memory, and the various external interfaces. The data is then configured by setting the stimuli and gold attributes of the TestInstance to objects of TestData class. The TestData may be a wrapper around a data file.

Figure 8:
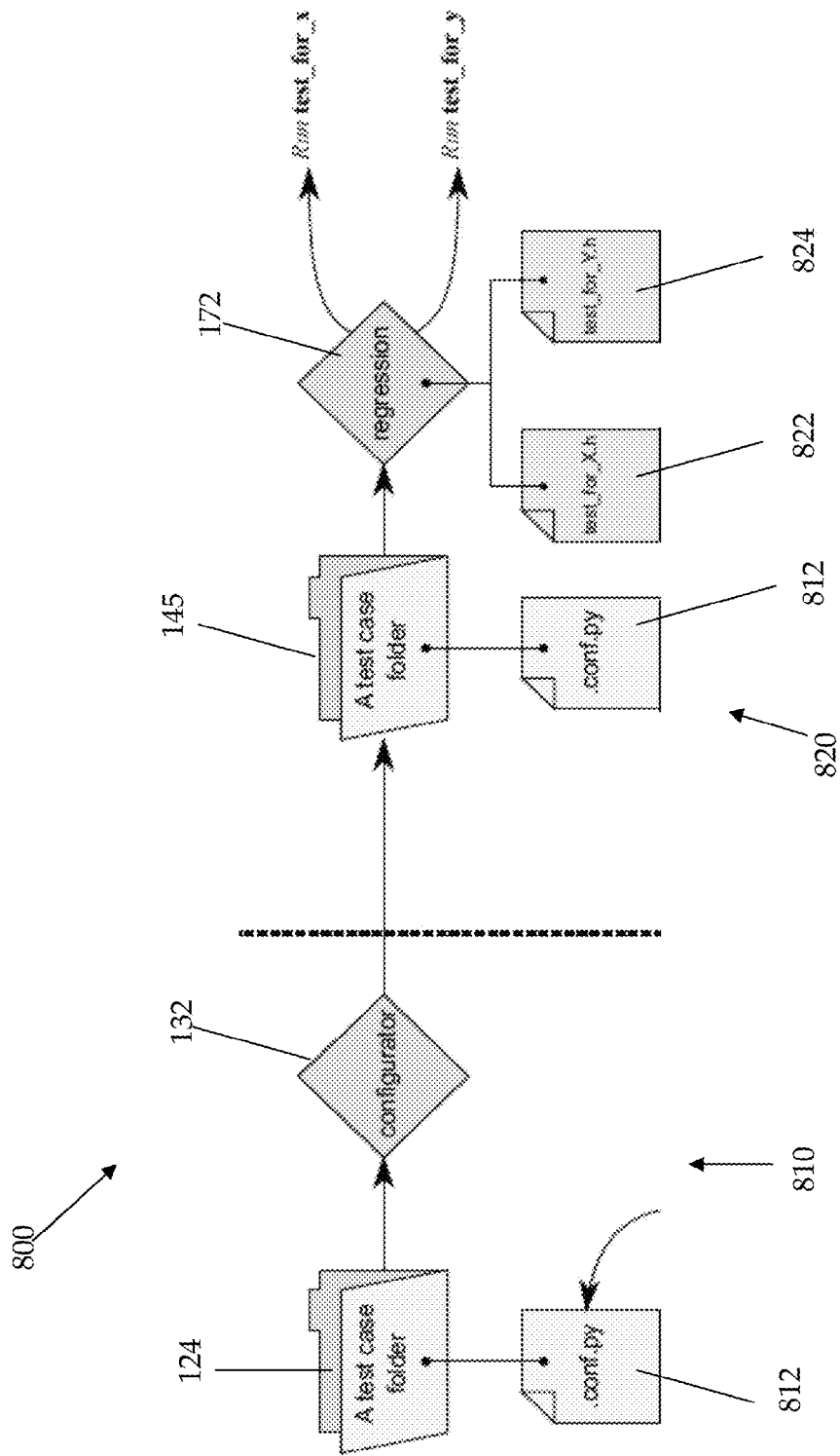
FIG. 8 is a flow chart illustrating an exemplary testing method.

FIG. 8 is a flow chart illustrating exemplary Allocate Method 800, which illustrates a utility of configurator 132 creating an architecture specific regression suite. Allocate Method 800 may be segmented into Pre-Configurator Flow 810 and Post-Configurator Flow 820. Within Pre-Configurator Flow 810, the flow starts with .conf.py file 812 and flows to test cases sub-library 124, and on to configurator 132. From configurator 132, the flow proceeds to Post-Configurator Flow 820, which includes test cases 145, which bilaterally communicates with .conf.py file 812. From test cases 145, the flow proceeds to regression 172, which runs X test 822 and Y test 824.

Allocate Method 800 may allow the test cases to be reused by different architectures. A TestCase class may declare an optional, static allocate method. Allocate Method 800 serves two purposes. First, it allows the declaration of the component type targeted by the test so that the test loader can instantiate the test case for each instance of that component type found in the architecture. Second, it allows the test case to declare the helper components required to perform the test, for example complex data memories when testing the CMAC. The targeted component is declared by calling an iteration method of the allocator object, and the helper components are declared by calling Allocate Method 800.

A single test case may be instantiated for multiple component instances by producing a specific header file for each instance. The header file remaps the architecture constants so that the correct instance is used by the test program. The test case iterates over all instances of a particular component, calling the instances by a generic identifier, for example 'cdmx'. The test program may be written as if there was a single instance called 'cdmx'. Test headers may be produced that remap the instances found in the architecture, giving them specific identifiers, for example 'cdm0', 'cdm1', etc. The test headers may be called by specific names indicating the type of test and the target component. These header files are created by the regression utility before the assembler is called. When a TestCase does not define an allocate method, the standard architecture header file may be used. This flow is illustrated in FIG. 8.

The regression module comes with several command line utilities for performing test functions. These may include "Covcheck", which reads the textual coverage report from Modelsim asserting that it fulfills the given requirements. Requirements can be set from the command line. The utility "Memcompare" compares two memory data files and prints the differences in a convenient format. The utility "Memmerge" splits a memory file into several banks or merges several memory bank files into one memory file. This utility may be required to split/merge memory files for loading/saving them in Modelsim. The utility "Memrand" reads a memory file and produces a random memory file with the same size and format as the original. This utility is used to generate random tests.

The DSP configuration may be changed, for example by changing the number of memories, and new HDL code for the revised DSP may be created by the configurator. In this manner, the system can generate custom DSPs. Each core is differentiated by the number and type of components instantiated, and by the interfaces (also referred to as host interfaces) with the DSP. A file (also referred to as an architecture file, and which may be a formatted XML file) describes the architecture of the DSP, including the programmable components and their interconnections.

An architecture file can instantiate any number and type of such components. For example, a DSP may be designed on the system to have five CMAC's. Additionally or alternatively, the precision may be set on the component level. For example, for each CMAC component, attributes and/or parameters may be set to state that the interface precision (also referred to as the network precision) of this component is five bits, whereas on another component the interface precision may be set to seven bits, or alternatively to another value. For example, a DSP may be designed to have a cross bar switch, two CMACs, four execution units, and one complex data memory having 20 kilo words with 14 bit precision.

A processor includes components, and every component may have different parameters, depending on the component. For example, a precision parameter may specify four kilobits, and another precision parameter may be 16 bits. Likewise, the amount and type of memory may be specified, and/or any other possible parameter for a programmable component of a DSP. In this manner multiple processor configurations may be programmed. Users and/or customers can make their own components and specify their own processors and their own systems.

Documentation may be automatically generated, including for example tables of all registers and ports and interfaces. Additionally, commentary from a programmer or designer may be associated with a component in the library which may be included in the documentation automatically upon utilization of the programmable component in an HDL file describing a DSP.

Each component in an architecture file describing a DSP includes a number of control registers that differ depending on the component. Each control register may require a certain amount of space, and there are requirements on how the control registers can be packed. Control register space optimization requires optimizing the packing of the control registers required for a DSP.

For example, with two components A and B, if A has five control registers, and B has one control register, the task of a configurator is to determine a control register prefix. Memory is allotted in units equal to powers of two, for example, two, four, eight, sixteen, etc. In this case, both components A and B may be optimally assigned to one memory having eight bits, rather than one memory having eight bits, and another memory having two bits. In this manner, the memory usage may be optimized by reducing the amount of unused hardware in the processor made pursuant to the HDL code generated by the configurator.

The configurator minimizes a size of the total control register space under the constraints that the base address of each component must be aligned. By requiring aligned base addresses, the size of the local address decoder logic in each component is reduced. By minimizing the total register space, the width of the global address bus and the address comparator in each local address decoder is minimized.

A significant area of optimization provided by the configurator enables a user to quickly and easily evaluate different configurations for a digital signal processor. For example, a user may apply restrictions to the network to reduce the hardware cost, and then evaluate the many different variants to find the global optimum. The configurator enables this evaluation, which is further facilitated tool by a system estimator tool.

Additionally, the control register prefixing may be optimized, along with a bus width. The configurator generates parameters through the HDL code indicating that a particular comparator should have a particular number of bits, for example eight, and a particular prefix. The configurator may apply parameters to the generated code to generate comparators of different word lengths during an optimization stage.

The configurator also compresses the code and optimizes the component interface for the architecture. For instance a bus width may be optimized depending on the number and size of the components described in a DSP architecture file. For example, a small DSP with ten components, with each using five addresses, may in the most optimal case have fifty control registers. In contrast, in an alternative architecture there may be five hundred control registers which may require a different bus width for the processor described in the generated HDL code. The optimization function may include a trade-off between the number of comparators and the size of the comparators.

Another area of optimization for the components is a local address decoder. Conventionally, each programmable component includes a local control register address decoder. If the address decoder is taken out of each programmable component, the configurator may instead generate one central address decoder component for all components. This may reduce the total amount of hardware since the configurator would store all relevant data for all of the programmable components and their associated control registers, and therefore the configurator could generate an optimized logic.

The configurator generates the HDL code, and also generates a toolkit and header files. The toolkit may be used by a programmer when programming a software-defined radio for the particular DSP that is produced based on the HDL code. In this manner, a DSP can also be easily rearranged while remaining source-code compatible. In particular, a particular processor, which is made based on an HDL file by a configurator working from an architecture file, may later be reprogrammed to run a different DSP by using the associated toolkit. The DSP may be programmed using C code, Matlab code, or assembly code, or any other appropriate language. Components of different word length can communicate by generating an adaption logic to ensure that a 16 bit component can communicate to a 14 bit component.

Conflict detection hardware may be generated by the configurator for each DSP generated. Conflict detection hardware may operate to detect run-time conflicts in a software-defined radio operating on the DSP processor. The conflict detection hardware may be matched to the corresponding DSP processor generated pursuant to the HDL code output by the configurator. A selection for the configurator may be made to generate conflict detection for the connection matrix, for example to ensure that no slave circuit is assigned to more than one master circuit, that no control registers are over-assigned, and that only legal connections are utilized. The configurator generates HDL code for the detection logic. The detection logic is a circuit closely coupled to the network in the DSP. The purpose of the conflict detection logic is to alert the program running on the DSP if an illegal operation is performed by the program. For example, the detection logic may assert an interrupt signal if a conflict is detected.

Each test case may include a program to run on the processor, sample data to be input to the program, and reference data to compare to an output of the program. The test generator may include a model adapted to modify the at least one corresponding test case based on a selectable parameter of the accessed programmable component. The model may generate at least one of the sample data and the reference data.

The at least one corresponding test case may include a list of at least one related programmable component that is necessary to run the test case and at least one property of the at least one related programmable component. The at least one property may include at least one of a parameter setting and a network connectivity. The at least one property may include a parameter setting of the at least one related programmable component set equal to a selectable parameter of the accessed programmable component. Each corresponding test case may include an alias designating each of the plurality of programmable components, and the test generator may map each alias to the accessed programmable component and the at least one related programmable component used in the processor.

The test suite may include a signal model and the test suite verifies that an output of the processor using the signal model corresponds to an expected output. The code may include at least one of a control register mapping and a network port mapping and the test suite may verify assignments of all control registers and all network ports. The test suite may be optimized to avoid duplication of testing of interconnections and control registers. The test suite may run on the processor having control registers assigned to the accessed programmable component, the accessed programmable component and the plurality of interconnections may be tested to ensure that a condition is met. The condition may be all control registers assigned to the accessed programmable component are functioning, no control register is assigned to more than one accessed programmable component, and/or all of the plurality of interconnections are tested.

The test suite may be run on the processor having at least one memory assigned to the accessed programmable component, and one of each type of accessed programmable component may be tested to ensure that a condition is met. The condition may be all memories are assigned to the one of each type of accessed programmable component are functioning, and/or all of the plurality of interconnections are tested.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A system, comprising:
    a library module comprising a plurality of programmable components and at least one corresponding test case for each programmable component;
    a configurator module coupled to the library module and accessing at least one of the plurality of programmable components and the at least one corresponding test case, the configurator module further outputting a code describing a processor for running a software-defined digital signal processor and including the accessed programmable component and a plurality of interconnections linking the accessed programmable component; and
    a test case generator coupled to the configurator module to output a test suite including the at least one corresponding test case for each accessed programmable component and a plurality of interconnect tests to test the plurality of interconnections linking the accessed programmable component;
    wherein the test suite is optimized to avoid duplication of testing of interconnections and control registers.

2. The system of claim 1, wherein each test case comprises a program to run on the processor, sample data to be input to the program, and reference data to compare to an output of the program.

3. The system of claim 2, wherein the test generator includes a model adapted to modify the at least one corresponding test case based on a selectable parameter of the accessed programmable component.

4. The system of claim 3, wherein the model generates at least one of the sample data and the reference data.

5. The system of claim 1, wherein the at least one corresponding test case comprises a list of at least one related programmable component that is used to run the test case and at least one property of the at least one related programmable component.

6. The system of claim 5, wherein the at least one property comprises at least one of a parameter setting and a network connectivity.

7. The system of claim 1, wherein the test suite comprises a signal model and the test suite verifies that an output of the processor using the signal model corresponds to an expected output.

8. The system of claim 1, wherein the code comprises at least one of a control register mapping and a network port mapping and the test suite verifies assignments of all control registers and all network ports.

9. A system comprising:
    a library module comprising a plurality of programmable components and at least one corresponding test case for each programmable component;

a configurator module coupled to the library module and accessing at least one of the plurality of programmable components and the at least one corresponding test case, the configurator module further outputting a code describing a processor for running a software-defined digital signal processor and including the accessed programmable component and a plurality of interconnections linking the accessed programmable component; and a test case generator coupled to the configurator module to output a test suite including the at least one corresponding test case for each accessed programmable component and a plurality of interconnect tests to test the plurality of interconnections linking the accessed programmable component;

wherein the at least one corresponding test case comprises a list of at least one related programmable component that is used to run the test case and at least one property of the at least one related programmable component; and wherein the at least one property comprises a parameter setting of the at least one related programmable component set equal to a selectable parameter of the accessed programmable component.

10. A system comprising:

a library module comprising a plurality of programmable components and at least one corresponding test case for each programmable component;

a configurator module coupled to the library module and accessing at least one of the plurality of programmable components and the at least one corresponding test case, the configurator module further outputting a code describing a processor for running a software-defined digital signal processor and including the accessed programmable component and a plurality of interconnections linking the accessed programmable component; and a test case generator coupled to the configurator module to output a test suite including the at least one corresponding test case for each accessed programmable component and a plurality of interconnect tests to test the plurality of interconnections linking the accessed programmable component;

wherein the at least one corresponding test case comprises a list of at least one related programmable component that is used to run the test case and at least one property of the at least one related programmable component; and wherein each corresponding test case comprises an alias designating each of the plurality of programmable components, and the test generator maps each alias to the accessed programmable component and the at least one related programmable component used in the processor.

11. A system comprising:

a library module comprising a plurality of programmable components and at least one corresponding test case for each programmable component;

a configurator module coupled to the library module and accessing at least one of the plurality of programmable components and the at least one corresponding test case, the configurator module further outputting a code describing a processor for running a software-defined digital signal processor and including the accessed programmable component and a plurality of interconnections linking the accessed programmable component; and a test case generator coupled to the configurator module to output a test suite including the at least one corresponding test case for each accessed programmable component and a plurality of interconnect tests to test the plurality of interconnections linking the accessed programmable component;

wherein when the test suite is run on the processor having control registers assigned to the accessed programmable component, the accessed programmable component and the plurality of interconnections are tested to ensure that a condition is met, the condition being at least one of all control registers assigned to the accessed programmable component are functioning, no control register is assigned to more than one accessed programmable component, and all of the plurality of interconnections are tested.

12. A system comprising:

a library module comprising a plurality of programmable components and at least one corresponding test case for each programmable component;

a configurator module coupled to the library module and accessing at least one of the plurality of programmable components and the at least one corresponding test case, the configurator module further outputting a code describing a processor for running a software-defined digital signal processor and including the accessed programmable component and a plurality of interconnections linking the accessed programmable component; and a test case generator coupled to the configurator module to output a test suite including the at least one corresponding test case for each accessed programmable component and a plurality of interconnect tests to test the plurality of interconnections linking the accessed programmable component;

wherein when the test suite is run on the processor having at least one memory assigned to the accessed programmable component, one of each type of accessed programmable component is tested to ensure that a condition is met, the condition being at least one of all memories assigned to the one of each type of accessed programmable component are functioning, and all of the plurality of interconnections are tested.

13. A non-transitory computer readable medium having recorded thereon a program, the program when executed causing a computer to perform a method, the method generating test cases for a processor designed by a configurator module, the method comprising:

accessing a library module comprising a plurality of programmable components and at least one corresponding test case for each programmable component;

outputting, using a configurator module coupled to the library module, a code describing the processor including at least one accessed programmable component and a plurality of interconnections linking the accessed programmable component, the processor to run a software-defined digital signal processor; and generating a test suite including the at least one corresponding test case for each accessed programmable component and a plurality of interconnect tests to test the plurality of interconnections linking the accessed programmable component;

wherein the at least one corresponding test case comprises a list of at least one related programmable component that is used to run the test case and at least one property of the at least one related programmable component; and wherein the at least one property comprises a parameter setting of the at least one related programmable component set equal to a selectable parameter of the accessed programmable component.

14. The non-transitory computer readable medium of claim 13, wherein each test case comprises a program to run on the processor, sample data to be input to the program, and reference data to compare to an output of the program.

15. The non-transitory computer readable medium of claim 14, wherein the step of generating of the test suite further comprises modifying the at least one corresponding test case for each accessed programmable component based on a selectable parameter of the accessed programmable component.

16. The non-transitory computer readable medium of claim 15, wherein the step of generating of the test suite further comprises generating at least one of the sample data and the reference data.

17. The non-transitory computer readable medium of claim 13, wherein the at least one property comprises at least one of a parameter setting and a network connectivity.

18. The non-transitory computer readable medium of claim 13, wherein the test suite comprises a signal model and the test suite verifies that an output of the processor using the signal model corresponds to an expected output.

19. A non-transitory computer readable medium having recorded thereon a program, the program when executed causing a computer to perform a method, the method generating test cases for a processor designed by a configurator module, the method comprising:
   accessing a library module comprising a plurality of programmable components and at least one corresponding test case for each programmable component;
   outputting, using a configurator module coupled to the library module, a code describing the processor including at least one accessed programmable component and a plurality of interconnections linking the accessed programmable component, the processor to run a software-defined digital signal processor; and
   generating a test suite including the at least one corresponding test case for each accessed programmable component and a plurality of interconnect tests to test the plurality of interconnections linking the accessed programmable component;
   wherein the at least one corresponding test case comprises a list of at least one related programmable component that is used to run the test case and at least one property of the at least one related programmable component; and
   wherein each corresponding test case comprises an alias designating each of the plurality of programmable components, and the test generator maps each alias to the accessed programmable component and the at least one related programmable component used in the processor.

20. A multi-core processor for processing digital signals tested by a method, the method comprising:
   accessing a library module comprising a plurality of programmable components and a corresponding set of test cases for each programmable component;
   outputting, using a configurator module coupled to the library module, a code describing the processor including at least one accessed programmable component and a plurality of interconnections linking the accessed programmable component, the multi-core processor to run a software-defined digital signal processor; and
   generating a test suite including the corresponding set of test cases for each accessed programmable component and a plurality of interconnect tests to test the plurality of interconnections linking the accessed programmable component;
   wherein the method further comprises optimizing the test suite to avoid duplication of testing of interconnections and control registers.

21. The multi-core processor of claim 20, wherein the method further comprises verifying by the test suite that an output of the processor using a signal model corresponds to an expected output.

22. The multi-core processor of claim 20, wherein the method further comprises verifying by the test suite that a programmable component output using a stimuli file associated with each accessed programmable component corresponds to a programmable component expected output.

23. A multi-core processor for processing digital signals tested by a method, the method comprising:
   accessing a library module comprising a plurality of programmable components and a corresponding set of test cases for each programmable component;
   outputting, using a configurator module coupled to the library module, a code describing the processor including at least one accessed programmable component and a plurality of interconnections linking the accessed programmable component, the multi-core processor to run a software-defined digital signal processor; and
   generating a test suite including the corresponding set of test cases for each accessed programmable component and a plurality of interconnect tests to test the plurality of interconnections linking the accessed programmable component;
   wherein the test suite is optimized to avoid duplication of testing of interconnections and control registers by discarding duplicate tests.

* * * * *